United States Patent
Eliáš et al.

(10) Patent No.: US 11,146,629 B2
(45) Date of Patent: Oct. 12, 2021

(54) PROCESS TRANSFER BETWEEN SERVERS

(71) Applicant: Red Hat, Inc., Raleigh, NC (US)

(72) Inventors: Filip Eliáš, Brno (CZ); Filip Nguyen, Brno (CZ)

(73) Assignee: RED HAT, INC., Raleigh, NC (US)

( * ) Notice: Subject to any disclaimer, the term of this patent is extended or adjusted under 35 U.S.C. 154(b) by 468 days.

(21) Appl. No.: 14/497,418

(22) Filed: Sep. 26, 2014

(65) Prior Publication Data

US 2016/0094644 A1    Mar. 31, 2016

(51) Int. Cl.
| | | |
|---|---|---|
| H04L 29/08 | (2006.01) | |
| G06F 15/16 | (2006.01) | |
| G06F 15/177 | (2006.01) | |
| H04N 21/458 | (2011.01) | |
| G06F 16/951 | (2019.01) | |

(52) U.S. Cl.
CPC ........ H04L 67/1034 (2013.01); G06F 16/951 (2019.01)

(58) Field of Classification Search
CPC ..... H04L 67/1034; H04L 47/70; H04L 67/26; H04L 67/10; H04L 65/60; H04L 67/42; G06F 17/30864; H04N 21/4725; H04N 21/42224; H04N 21/4122
USPC ................................................ 709/201–232
See application file for complete search history.

(56) References Cited

U.S. PATENT DOCUMENTS

| | | | | |
|---|---|---|---|---|
| 6,108,715 A * | 8/2000 | Leach | ..................... | G06F 9/547 709/203 |
| 6,212,396 B1 * | 4/2001 | Brown | ............... | H04M 1/72511 455/450 |
| 6,442,564 B1 * | 8/2002 | Frey | ........................ | G06F 9/465 |
| 6,523,168 B1 * | 2/2003 | Arnold | .................. | G06F 8/4441 717/116 |
| 7,949,893 B1 | 5/2011 | Knaus | | |
| 7,953,883 B2 | 5/2011 | Thomas | | |
| 8,145,838 B1 | 3/2012 | Miller | | |
| 8,484,259 B1 * | 7/2013 | Makkar | ............ | G06F 16/90335 707/827 |
| 9,064,013 B1 * | 6/2015 | Gay | ........................ | H04L 29/06 |

(Continued)

FOREIGN PATENT DOCUMENTS

| | | |
|---|---|---|
| CN | 103595572 | 2/2014 |
| JP | 2009086741 | 4/2009 |

OTHER PUBLICATIONS

Failover and Replication in a Cluster, http://docs.oracle.com/cd/E13222_01/wls/docs90/cluster/failover.html.

(Continued)

*Primary Examiner* — David R Lazaro
*Assistant Examiner* — Berhanu Shitayewoldetadik
(74) *Attorney, Agent, or Firm* — Haynes and Boone, LLP (57) ABSTRACT

According to one example, a method performed by a computing system includes, with a first server, receiving a process request, starting processing of the process request, prior to completing the processing of the process request, storing objects associated with a thread of the process request in an object database that is accessible by the second server, storing thread metadata for the thread of the process request in a metadata database that is accessible by the second server, and sending a transfer request to a switching manager, the transfer request being to request that the process request be shifted to the second server.

15 Claims, 6 Drawing Sheets

(56) References Cited

U.S. PATENT DOCUMENTS

| | | | | |
|---|---|---|---|---|
| 2002/0194388 A1* | 12/2002 | Boloker | G06F 8/38 | 719/310 |
| 2003/0033344 A1* | 2/2003 | Abbott | G06F 9/4843 | 718/1 |
| 2003/0041334 A1* | 2/2003 | Lu | H04N 21/2187 | 725/113 |
| 2003/0056002 A1* | 3/2003 | Trethewey | H04L 67/1002 | 709/238 |
| 2003/0084164 A1* | 5/2003 | Mazzitelli | H04L 69/162 | 709/227 |
| 2004/0087348 A1* | 5/2004 | Desch | H04N 5/44543 | 455/566 |
| 2004/0121815 A1* | 6/2004 | Fournier | H04M 1/72445 | 455/563 |
| 2004/0122917 A1* | 6/2004 | Menon | H04L 67/1002 | 709/219 |
| 2005/0015471 A1* | 1/2005 | Zhang | H04L 63/0442 | 709/221 |
| 2005/0086242 A1* | 4/2005 | Ngai | G06F 17/30289 | |
| 2005/0154838 A1* | 7/2005 | DeWitt | G06F 9/384 | 711/144 |
| 2006/0101081 A1* | 5/2006 | Lin | G06F 16/2343 | |
| 2006/0143239 A1* | 6/2006 | Battat | G06F 16/2365 | |
| 2006/0143350 A1* | 6/2006 | Miloushev | G06F 9/5016 | 710/242 |
| 2007/0118857 A1* | 5/2007 | Chen | H04N 5/765 | 725/61 |
| 2007/0136311 A1* | 6/2007 | Kasten | H04L 67/28 | |
| 2007/0180308 A1* | 8/2007 | Zohar | G06F 11/1435 | 714/6.23 |
| 2007/0198724 A1* | 8/2007 | Hawkinson | H04L 29/06 | 709/226 |
| 2007/0243837 A1* | 10/2007 | Krishnamoorthi | H04L 25/0232 | 455/115.1 |
| 2008/0066126 A1* | 3/2008 | Walter | H04L 65/4084 | 725/97 |
| 2008/0134212 A1* | 6/2008 | Chauvel | G06F 9/4812 | 719/318 |
| 2008/0147452 A1* | 6/2008 | Renz | H04L 47/70 | 705/7.11 |
| 2008/0163075 A1* | 7/2008 | Beck | H04L 67/10 | 715/759 |
| 2008/0228923 A1* | 9/2008 | Chidambaran | H04L 67/2809 | 709/227 |
| 2008/0294648 A1* | 11/2008 | Lin | G06F 16/2343 | |
| 2009/0177914 A1 | 7/2009 | Winchell | | |
| 2009/0217356 A1* | 8/2009 | Scott | G06F 21/60 | 726/4 |
| 2009/0228910 A1* | 9/2009 | Christinat | G06F 21/31 | 725/11 |
| 2010/0082784 A1* | 4/2010 | Rosenblatt | H04L 12/2812 | 709/222 |
| 2010/0093438 A1* | 4/2010 | Baszucki | A63F 13/12 | 463/42 |
| 2010/0146206 A1* | 6/2010 | Yochai | G06F 11/2092 | 711/114 |
| 2010/0186020 A1* | 7/2010 | Maddhirala | G06F 9/5038 | 718/105 |
| 2010/0274793 A1* | 10/2010 | Koskimies | G06Q 10/10 | 707/754 |
| 2011/0258614 A1* | 10/2011 | Tamm | G06F 11/3644 | 717/129 |
| 2011/0276335 A1* | 11/2011 | Silvera | G11B 27/105 | 704/275 |
| 2012/0117644 A1* | 5/2012 | Soeder | G06F 21/554 | 726/22 |
| 2012/0124018 A1* | 5/2012 | Horii | G06F 9/45504 | 707/693 |
| 2012/0151063 A1* | 6/2012 | Yang | H04L 69/329 | 709/226 |
| 2012/0159527 A1* | 6/2012 | Perez | H04N 21/44218 | 725/10 |
| 2012/0196616 A1* | 8/2012 | Edge | G01S 5/0036 | 455/456.1 |
| 2012/0265804 A1* | 10/2012 | Ashcraft | G06F 9/5016 | 709/203 |
| 2012/0271880 A1* | 10/2012 | Sachdeva | H04L 67/06 | 709/203 |
| 2012/0311282 A1* | 12/2012 | Cannon | G06F 16/119 | 711/162 |
| 2013/0073688 A1* | 3/2013 | Limbasia | G06F 9/4843 | 709/219 |
| 2013/0152064 A1* | 6/2013 | Gagliardi | G06F 9/44521 | 717/166 |
| 2013/0298147 A1* | 11/2013 | Klein | H04N 21/2668 | 725/13 |
| 2013/0332507 A1* | 12/2013 | Du | H04L 47/125 | 709/203 |
| 2014/0026048 A1* | 1/2014 | Spirer | G06F 3/0484 | 715/716 |
| 2014/0053208 A1* | 2/2014 | Sirpal | H04N 21/414 | 725/52 |
| 2014/0068544 A1* | 3/2014 | Fanning | G06F 16/907 | 717/100 |
| 2014/0176728 A1* | 6/2014 | Birch | H04N 17/004 | 348/181 |
| 2014/0195626 A1* | 7/2014 | Ruff | H04W 12/088 | 709/206 |
| 2014/0283040 A1* | 9/2014 | Wilkerson | G06F 21/52 | 726/22 |
| 2014/0379813 A1* | 12/2014 | Charania | H04L 51/24 | 709/206 |
| 2015/0006843 A1* | 1/2015 | Moser | G06F 12/0253 | 711/170 |
| 2015/0128046 A1* | 5/2015 | Cormican | H04N 21/23424 | 715/720 |
| 2015/0268989 A1* | 9/2015 | Busch | G06F 12/0246 | 711/103 |
| 2015/0331720 A1* | 11/2015 | Huetter | G06F 9/5016 | 718/104 |
| 2016/0029082 A1* | 1/2016 | Wordley | H04N 21/462 | 725/52 |
| 2016/0086260 A1* | 3/2016 | Vermeulen | G06Q 40/00 | 705/35 |
| 2016/0328488 A1* | 11/2016 | Lytle | G06F 16/252 | |

OTHER PUBLICATIONS

Failover Cluster, http://msdn.microsoft.com/en-us/library/ff650328.aspx.

Wang Yu, Under the Hood of J2EE Clustering, Aug. 1, 2005, http://www.theserverside.com/news/1364410/Under-the-Hood-of-J2EE-Clustering.

\* cited by examiner

PROCESS TRANSFER BETWEEN SERVERS

BACKGROUND

The present disclosure relates generally to distributed applications, and more particularly to methods and systems for shifting processes of a distributed application between servers.

Distributed applications are applications that run on several nodes, or servers, within a cluster of servers. Each of the servers in the cluster may be connected over a network. The various servers in a cluster may have access to different resources or have different computing capabilities. A distributed application works in general by having a management node receive a process request from a client device. The management node then selects a server within the cluster to which to send the process request. The selected server then processes that request accordingly.

Such distributed systems provide a number of benefits. For example, if one of the servers fails or is otherwise unable to complete a request, a different server within the cluster can take that request and execute that process request for the client. But, when this happens, the client generally has to send a new process request to a different server. The different server then processes the request from the beginning. In some cases, the distributed application can leave certain resources in an inconsistent state. It is desirable to have methods and systems that provide more efficient processing of client requests.

SUMMARY

According to one example, a method performed by a computing system includes, with a first server, receiving a process request, starting processing of the process request, prior to completing the processing of the process request, storing objects associated with a thread of the process request in an object database that is accessible by the second server, storing thread metadata for the thread of the process request in a metadata database that is accessible by the second server, and sending a transfer request to a switching manager, the transfer request being to request that the process request be shifted to the second server.

A method performed by a server includes receiving, from a switching manager, a transfer request to continue processing of a process request that has been started and not completed by another server, loading, from a periodically updated metadata database, thread metadata associated with each thread of the process request, the thread metadata being stored in the metadata database by the other server, loading, from a periodically updated object database, objects associated with each thread of the process request, the objects being stored in the object database by the other server, and continuing processing of the process request.

A system includes a switching manager, an object database, a metadata database, and a plurality of servers within a cluster. Each of the servers includes a processor and a memory comprising machine readable instructions that when executed by the processor, cause the server to receive from the switching manager, a transfer request to execute a process request, store objects associated with a thread of the process request in the object database, the object database being accessible by the plurality of servers, and store thread metadata for the thread of the process request in the metadata database, the metadata database being accessible by the plurality of servers. In response to an event, the switching manager is to cause the process request to be shifted to another one of the plurality of servers.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to have methods and systems that provide more efficient processing of client requests. According to principles described herein, requests that have started processing on one server can be transferred to another server such that the other server does not have to start the processing of the request over. This allows for a more efficient transfer of request processing between servers. In one example, the transfer can be initiated by the server processing the request. For example, it may be the case that another server is closer to a resource that is used by a particular request. Thus, it would be better to transfer the request to that server for processing. In another example, the transfer can be caused by a server failing or otherwise becoming unavailable to process a particular request. The following provides more detail regarding how a request is transferred from a first server to a second server without the second server having to start processing the request from the beginning.

Figure 1:
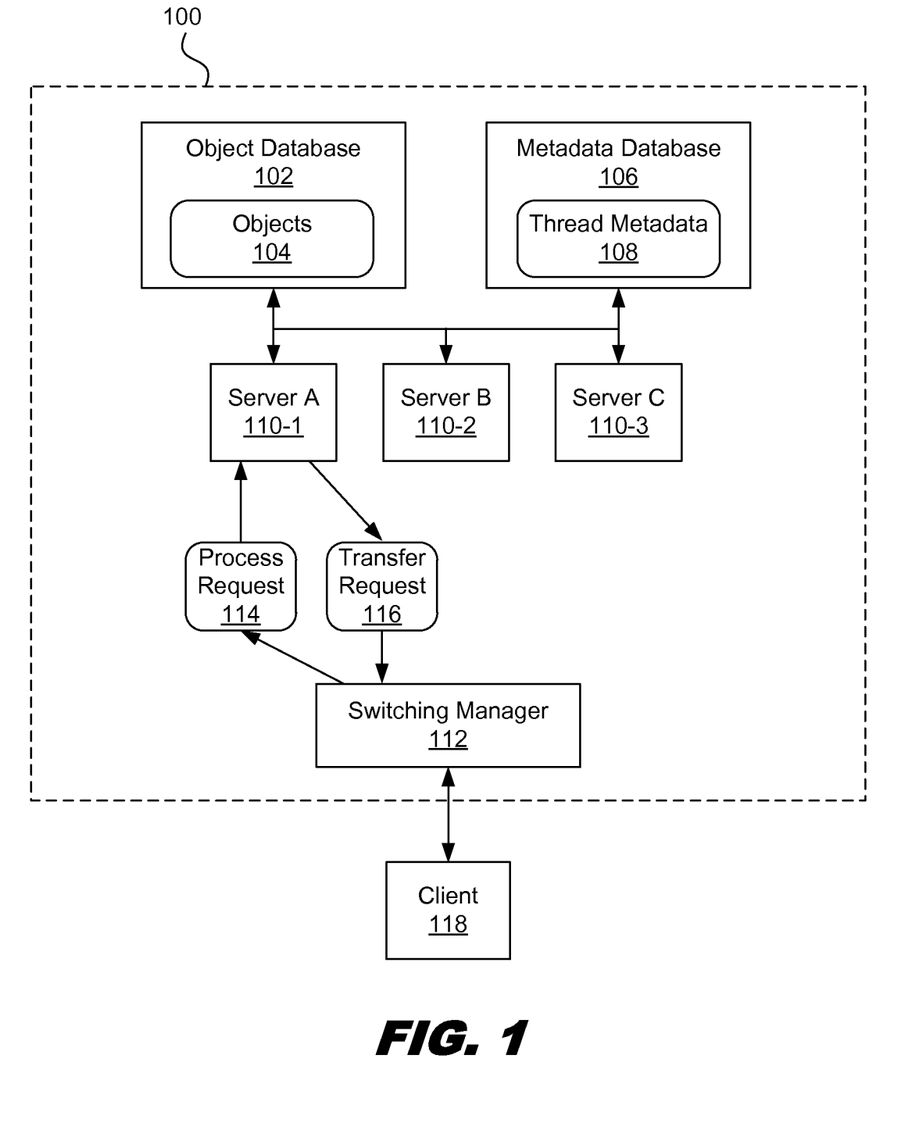
FIG. 1 is a diagram showing an illustrative cluster of servers that are capable of processing requests for distributed applications, according to one example of principles described herein.

FIG. 1 is a diagram showing an illustrative cluster 100 of servers 110 that are capable of processing requests for distributed applications. According to the present example, a cluster 100 includes a number of servers 110. The cluster 100 also includes at least one object database 102 for storing objects 104. The cluster 100 also includes at least one metadata database 106 for storing thread metadata 108. The cluster 100 also includes a switching manager 112 for receiving requests from a client device 118.

A cluster 100 is a set of computing systems that work together to perform various tasks. The different computing systems within the cluster 100 may be networked using various networking media and protocols. The cluster 100 may be adapted to perform specific types of computing tasks. For example, the cluster 100 may be adapted to execute distributed applications for client devices. In some cases, the cluster 100 may be viewed as a single entity by an outside device such as the client device 118.

The client device 118 may be any device that interacts with the cluster 100. The client device 118 may be one of several types of devices. For example, the client device 118 may be a personal computer, a laptop computer, a smart phone, a tablet, or other appropriate computing device. The client 118 may be in communication with the cluster 100 over a network such as the Internet. The client device 118 may send a request 114 related to a distributed application to the switching manager 112 within the cluster 100.

The switching manager 112 manages the processing of requests that are distributed across multiple servers 110. Thus, the switching manager 112 receives requests from the client device 118 and then selects a server 110 to process those requests. The switching manager 112 also monitors the servers 110 to see if any of the servers become unavailable. In such case, the switching manager 112 can assign the tasks that were being performed by the now unavailable server to another server.

The switching manager 112 may also receive a transfer request 116 from one of the servers 110. A transfer request 116 is a request to transfer the processing of a request 114 to a different server. For purposes of distinguishing the transfer request 116 from the request 114 sent from the client 118, the request 114 sent from the client 118 will sometimes be referred to as the process request. In the present example, the switching manager 112 sends a request 114 to server A 110-1 for processing. Server A then begins to process that request 114. But, in response to an event, server A 110-1 sends a transfer request 116 to the switching manager 112. The transfer request 116 notifies the switching manager 112 that server A 110-1 would like to transfer the request 116 to a different server. The switching manager 112 then decides which of server B 110-2 or server C 110-3 should handle the request 114. A variety of factors may be considered when deciding which server 110 should process the request 114. Such factors will be discussed in further detail below.

The servers 110 are used to process requests 114 from client devices such as client device 118. The servers 110 may include specialized processing hardware to perform various computing tasks. In one example, the servers 110 include a Java Virtual Machine (JVM) for executing java bytecode. Thus, the servers can execute a process request 114 that is in the form of java bytecode.

The object database 102 can be used to facilitate efficient transfer of process requests 114 between servers. Specifically, when threads for a particular request are being processed by a server 110, the objects 104 created by that thread can be stored in the object database 102 in addition to being stored in the heap of the server 110. The object database 102 can be accessible by all servers 110 in the cluster 100. Thus, if a different server takes over a request, it can access objects 104 that have already been created for that request. In one example, the object database 102 may be a JBoss Data Grid (JDG). As will be explained in further detail below, the object database 104 may have a hierarchical structure.

Objects 104 may refer to a location in memory that has a value and may be referenced by an identifier. An object may be a variable, a function, or some type of data structure. In some cases, an object may represent an instance of a class and may thus include a combination of variables, functions, and data structures.

The metadata database 106 can also be used to facilitate efficient transfer of process requests 114 between servers. Specifically, when a thread for a particular request is being processed by a server 110, relevant metadata 108 for that thread can be stored in the metadata database 106 in addition to being utilized locally by the server 110. The metadata database 106 can be accessible by all servers 110 in the cluster 100. Thus, if a different server takes over a request, it can access metadata 108 for the threads associated with that request. In one example, the metadata database may be a JVM State Storage (JSS). As will be explained in further detail below, the metadata database 106 may have a hierarchical structure.

Thread metadata 108 may include any metadata about threads of a request that are relevant to a server that is to take over the request. Thread metadata 108 may include a call stack associated with the threads, including all the stack frames within that stack. A call stack is a stack data structure that stores information about the active subroutines of a computer program. The thread metadata 108 may also include the program counter. The program counter is a value that is generally stored within one of the processor registers. The program counter indicates the memory location of the next instruction to be fetched by the processor.

Figure 2:
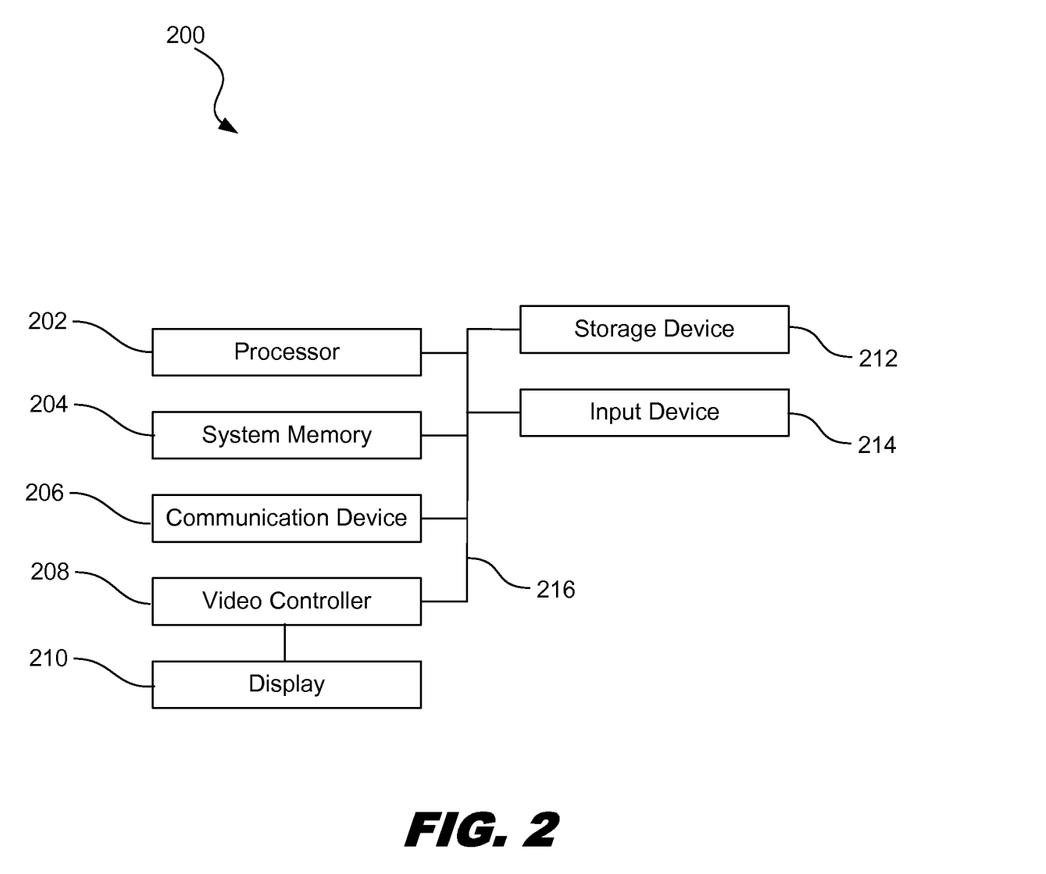
FIG. 2 is a diagram showing an illustrative computing system that may perform functions related to switching the processing of requests between servers, according to one example of principles described herein.

FIG. 2 is a diagram showing an illustrative computing system 200 that may be used to in accordance with principles described herein. According to the present example, the computing system 200 includes a processor 202, an input device 214, a storage device 212, a video controller 208, a system memory 204, a display 210, and a communication device 206, all of which are interconnected by one or more buses 216.

In some examples, the storage device 212 may include a floppy drive, hard drive, CD-ROM, optical drive, any other form of storage device and/or any combination thereof. In several exemplary embodiments, the storage device 212 may include, and/or be capable of receiving, a floppy disk, CD-ROM, DVD-ROM, or any other form of computer readable medium that may contain executable instructions. In one example, the computer readable medium is a non-transitory tangible media.

In some examples, the communication device 206 may include a modem, network card, or any other device to enable the computing system 200 to communicate with other computing devices. In some examples, any computing device represents a plurality of interconnected (whether by intranet or Internet) computer systems, including without limitation, personal computers, mainframes, PDAs, smartphones and cell phones.

In some examples, a computer system typically includes at least hardware capable of executing machine readable instructions, as well as the software for executing acts (typically machine-readable instructions) that produce a desired result. In some examples, a computer system may include hybrids of hardware and software, as well as computer sub-systems.

In some examples, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into a silicon chip. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 204, and/or any combination thereof, may be executed by a processor 202 to cause the processor 202 to carry out or implement in whole or in part the operation of the system 200, one or more of the methods. In some examples, such a processor 202 may execute the plurality of instructions in connection with a virtual computer system.

The computing system 200 may perform the function of any of the components described in FIG. 1. For example, the computing system 200 may be a client device 118. The computing system may be a switching manager 112, a server 110, an object database 102, or a metadata database 106. Additionally, the computing system 200 may perform the processes that will be described below.

Figure 3:
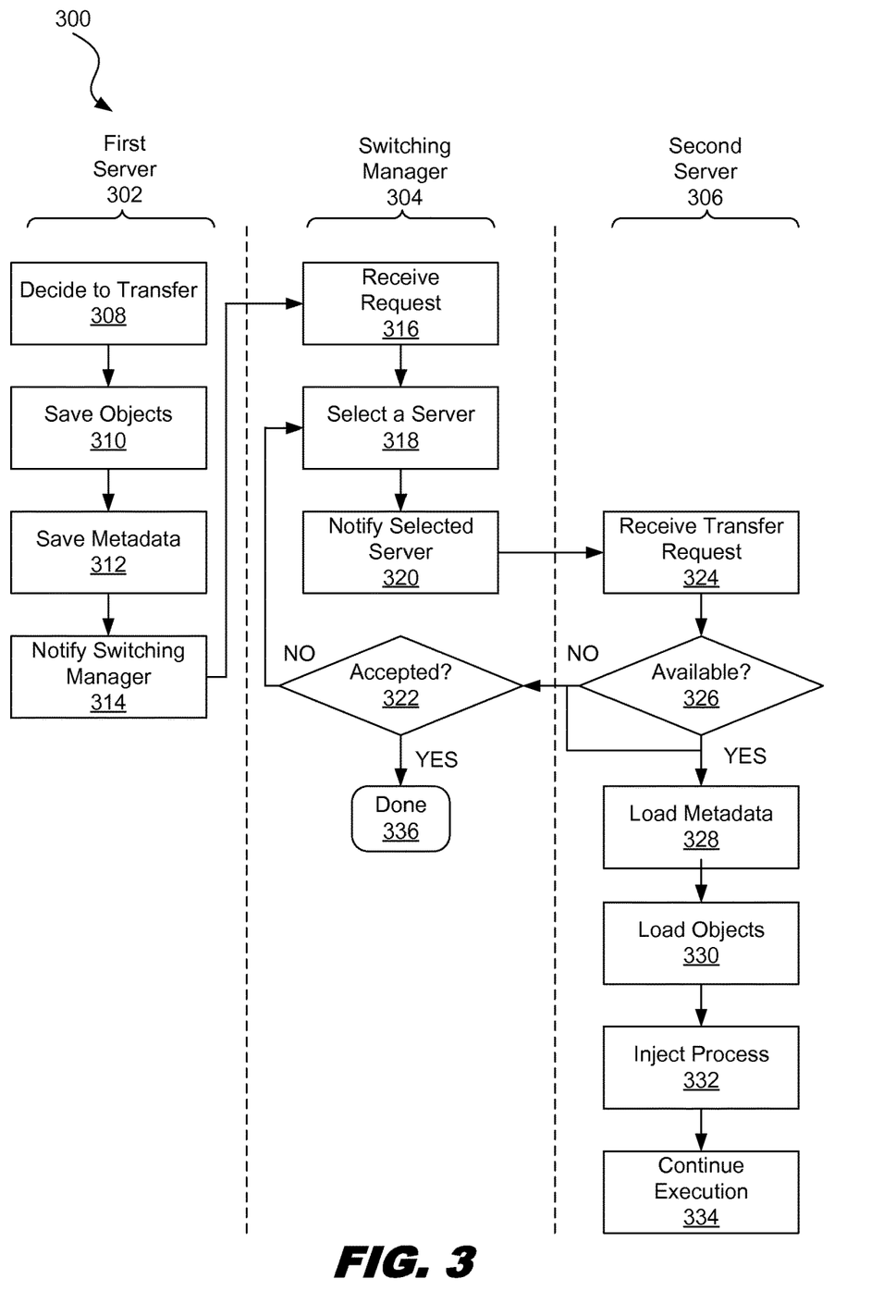
FIG. 3 is a flowchart showing an illustrative process for a server initiated switching of request processing between servers, according to one example of principles described herein.

FIG. 3 is a flowchart showing an illustrative method for server initiated transfer of a request between servers. FIG. 3 illustrates steps performed by a first server 302 from which a request is to be transferred, a second server 306 to which the request is to be transferred, and a switching manager 304. The first server 302 and the second server 306 may each be one of the servers 110 illustrated in FIG. 1. Likewise, the switching manager 304 may be the switching manager 112 illustrated in FIG. 1.

According to the present example, the method 300 includes a step 308 for deciding to transfer the processing of a request to a different server after the processing of the request has already been started by the first server 302. This decision may be triggered by a variety of different events. For example, it may be that after the first server 302 has started processing a request, it determines that another server within the cluster has better capabilities for processing that request. Specifically, another server may have specialized hardware that is better suited for processing the request. In another example, it may be determined that another server has better access to a resource that is utilized by the request. That other server would thus be able to process the request more efficiently.

The method 300 further includes a step 310 for saving objects to the object database. The objects saved to the database may be only the objects associated with the request that is to be transferred. These objects are currently stored in the heap of the first server 302. The heap is a portion of dynamically assigned memory that may be used to store data. As described above, other servers also have access to the object database. Thus, the server that will eventually take over processing the request can obtain the objects from the object database.

The method 300 further includes a step 312 for saving metadata to the metadata database. As described above, the metadata includes the program counter and the call stack, including the stack frames within that call stack. The metadata database is accessible by other servers in the cluster. Thus, the server that takes over processing the request can obtain the metadata from the metadata database.

The method 300 further includes a step 314 for notifying the switching manager 304 that the first sever 302 would like to transfer a request to a different server. This may be done by sending a transfer request to the switching manager 304. In some examples, the transfer request may include a number of arguments. The arguments may be useful for the switching manager to determine what server is best able to take over the processing of that process request. For example, if the first server 302 decides to transfer a request because another server may be more capable, then the arguments may indicate the type of capabilities that the new server should have. Similarly, if the transfer request is in response to a determination that another server has better access to a resource, then the arguments may indicate what type of resources are sought. Thus, the switching manager 304 can select a server based on which server is closest to the sought after resources. In some examples, the arguments may indicate a specific server within the cluster that should take over the processing of the request.

The method 300 further includes a step 316 for receiving a transfer request at the switching manager 304. This allows the switching manager 304 to know that the first server 302 wishes to transfer processing of a request to a different server. The switching manager can then start the process of determining whether such a transfer can be done. The switching manager 304 also receives any arguments that were passed along with the transfer request.

The method 300 further includes a step 318 for selecting a server to which to transfer the request. In some examples, the switching manager 304 selects any other server in the cluster at random. In some cases, the switching manager 304 selects a random one of a subset of servers that have the sought after capabilities that caused the process to be transferred. Thus, the subset may be based on the arguments received by the switching manager 304. In some examples, if the first server 302 indicated a specific server to which to transfer the process request, then the switching manager 304 can simply select the indicated server.

The method 300 further includes a step 320 for notifying the selected server, which in this example is the second server 306. At step 324, the second server 306 receives the transfer request. The second server 306 then determines, at step 326, whether or not the second server 306 is available to process the request. For example, if the second server 306 has a full load of processes to perform, then the second server 306 may decline the transfer request. But, if the second server 306 is able to process the new request, it will proceed to do so. Either way, the second server notifies the switching manager 304 whether or not it is available to take over processing of the request.

At step 322, the switching manager 304 determines whether the second server 306 has accepted the transfer request. If the second server 306 has accepted the transfer request, then the switching manager 304 has no more tasks related to the transfer request. Thus, the switching manager can proceed to perform other tasks. But, if the second server 306 does not accept the transfer request, then the method 300 returns to step 318 where the switching manager selects a different server. If no server is available to take the transfer request, then the switching manager 304 can notify the first server 302 accordingly.

The method 300 further includes a step 328 for loading metadata from the metadata database to the second server 306. The metadata is used to continue processing the request where the first server 302 discontinued processing of the request. As will be described in further detail below, the second server 306 may identify the appropriate metadata within the metadata database based on the hierarchical structure of the metadata database.

The method 300 further includes a step 330 for loading objects from the object database to the second server 306. The objects are the objects that were created by threads of the process request that is being transferred while the request started processing on the first server 302. As will be described in further detail below, the second server 306 may identify the appropriate objects within the object database based on the hierarchical structure of the metadata database.

The method 300 further includes a step for injecting the process request into the processing system of the second server 306. More detail on the injection process will be described below. After the process has been injected, the method 300 proceeds as the second server performs a step 334 for continuing execution of the process request. Thus, the process request does not have to be restarted by the second server 306.

Figure 4:
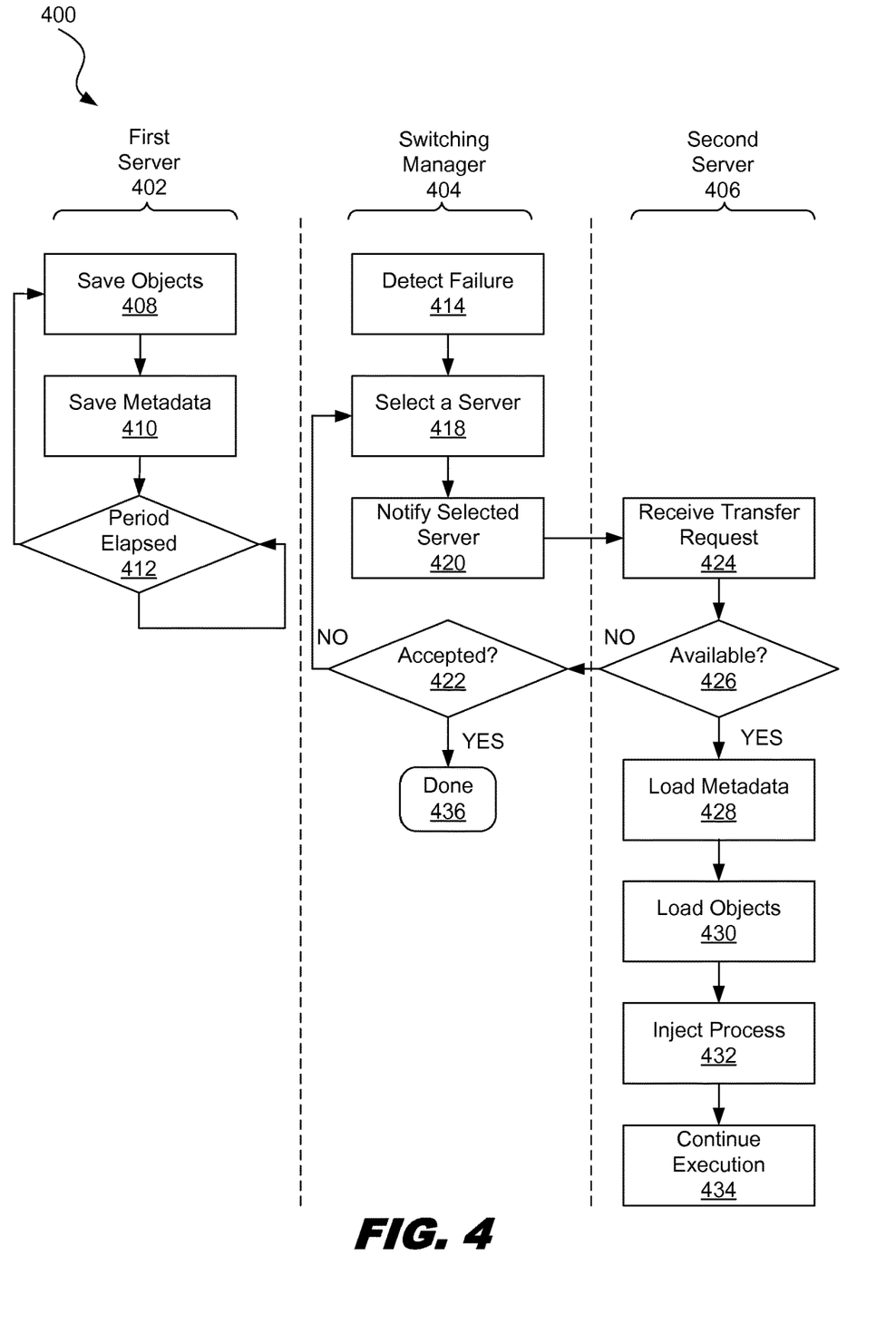
FIG. 4 is a flowchart showing an illustrative process for failover switching of request processing between servers, according to one example of principles described herein.

FIG. 4 is a flowchart showing an illustrative method 400 for failover transfer of a process between servers. According to the present example, the first server 402 periodically saves objects and thread metadata so that in the event that the first server 402 fails or otherwise becomes unavailable to continue processing a request, a second server 406 can take over processing the request from the last save point.

The method 400 further includes a step 408 for saving objects to the object database. The objects saved to the database may be only the objects associated with the request that is to be transferred. These objects are currently stored in the heap of the first server 402. As described above, other servers also have access to the object database. Thus, the server that will eventually take over processing the request can obtain the objects from the object database.

The method 400 further includes a step 412 for saving metadata to the metadata database. As described above, the metadata includes the program counter and the call stack, including the stack frames within that call stack. The metadata database is accessible by other servers in the cluster. Thus, the server that takes over processing the request can obtain the metadata from the metadata database.

The method further includes a step 412 for determining if a period of time has elapsed since the last save point. The save point is the point in time at which objects and metadata were saved to the object database and metadata database respectively. The period of time may be set to balance the overhead costs of saving the objects and metadata with the amount of processing time lost since the most recent save point. In one example, the period may be 30 seconds. In one example, the period may be within a range from about 5 seconds to 60 seconds. If the period has not elapsed, then nothing is done. But, if the period has elapsed, then the method goes back to step 408 and the objects and the metadata are updated in the object database and metadata database respectively.

At step 414, the switching manager 404 detects that the first server 412 has failed or is otherwise unavailable. The switching manager 404 may monitor the status of all servers within a cluster. Thus, if one server fails or otherwise becomes unavailable, the switching manager 404 will know. A server may become unavailable for a variety of reasons. For example, the server itself may malfunction and cease to operate. In some cases, the server may become disconnected from the network that connects the server to other devices within the cluster.

The method 400 further includes a step 418 for selecting a server to which to transfer the request. In some examples, the switching manager 404 selects any other server in the cluster at random. In some cases, the switching manager 404 may select a server from a subset of servers having the capability to process the request that had started processing on the failed server.

The method 400 further includes a step 420 for notifying the selected server, which in this example is the second server 406. At step 424, the second server 406 receives the transfer request. The second server 406 then determines, at step 426, whether or not the second server 406 is available to process the request. For example, if the second server 406 has a full load of processes to perform, then the second server 406 may decline the transfer request. But, if the second server 406 is able to process the new request, it will proceed to do so. Either way, the second server 406 notifies the switching manager 404 whether or not it is available to take over processing of the request.

At step 422, the switching manager 404 determines whether the second server 406 has accepted the transfer request. If the second server 406 has accepted the transfer request, then the switching manager 404 has no more tasks related to the transfer request. Thus, the switching manager 404 can proceed to perform other tasks. But, if the second server 406 does not accept the transfer request, then the method 400 returns to step 418 where the switching manager 404 selects a different server. If no server is available to take the transfer request, then the switching manager 304 can notify client device that sent the request that the request cannot be processed at this time.

The method 400 further includes a step 428 for loading metadata from the metadata database to the second server 406. The metadata is used to continue processing the request from the save point at which the objects and metadata were last saved to the object database and the metadata database. As will be described in further detail below, the second server 406 may identify the appropriate metadata within the metadata database based on the hierarchical structure of the metadata database.

The method 400 further includes a step 430 for loading objects from the object database to the second server 406. The objects are the objects that were created by threads of the process request that is being transferred. As will be described in further detail below, the second server 306 may identify the appropriate objects within the object database based on the hierarchical structure of the metadata database.

The method 400 further includes a step for injecting the process request into the processing system of the second server 406. More detail on the injection process will be described below. After the process has been injected, the method 400 proceeds as the second server performs a step 434 for continuing execution of the process request. Thus, the process request does not have to be restarted by the second server 406.

Figure 5A:
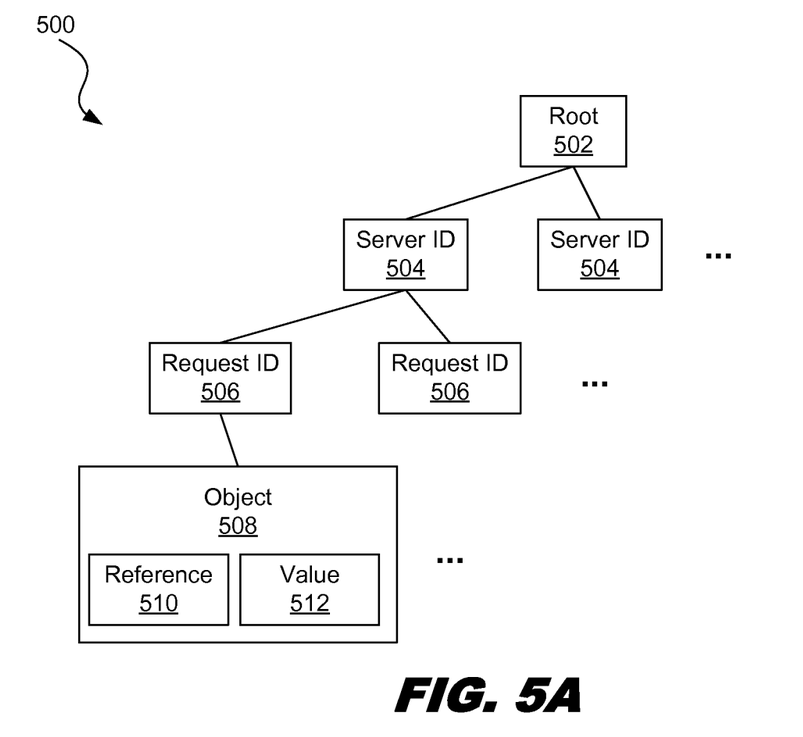
FIGS. 5A and 5B are diagrams showing illustrative hierarchy for objects and thread metadata, according to one example of principles described herein.
Figure 5B:
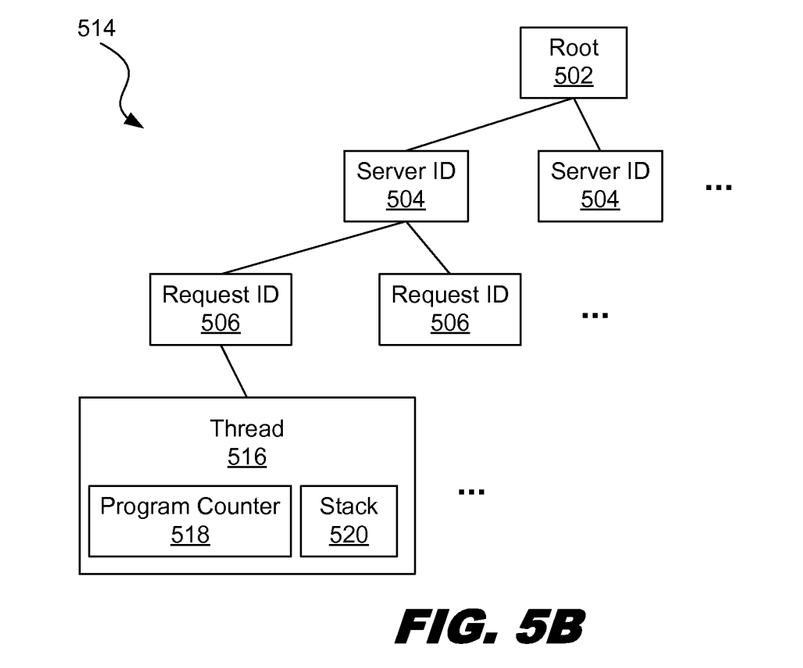

FIGS. 5A and 5B are diagrams showing illustrative hierarchy for objects and thread metadata. FIG. 5A illustrates a hierarchical structure 500 for an object database. According to the present example, the object database has a root node 502. The child nodes of the root node 502 represent server nodes 504. The server nodes 504 identify the different servers within a cluster. The child nodes of the server nodes 504 are the request nodes 506. The request nodes 506 represent and identify requests being processed by the server of the parent server node 504. The child nodes of the request nodes are the object nodes 508. There may be an object node 508 for each object created by threads associated with the request of the parent request node 506. The object nodes 508 include a reference 510 and a value 512. The reference 510 indicates the memory location of the object. The value 512 represents the data stored in the memory address of the reference 510.

FIG. 5B illustrates the hierarchical structure 514 for the metadata database. According to the present example, the metadata database has a root node 502. The child nodes of the root node 502 represent server nodes 504. The server nodes 504 identify the different servers within a cluster. The child nodes of the server nodes 504 are the request nodes 506. The request nodes 506 represent and identify requests being processed by the server of the parent server node 504. The child nodes of the request nodes 506 are the thread nodes 516. The thread nodes represent the threads associated with a particular process. The thread nodes 516 include the metadata such as the program counter 518 and the call stack 520. The call stack 520 includes all the stack frames within the call stack 520.

Use of the hierarchical object database and metadata base can allow a server that is taking over processing of a request to easily find the desired data. For example, if server B 110-2 is taking over a request from server A 110-1, then server B 110-2 will look at the request node 506 associated with the server node 504 associated with server A 110-1. Server N 110-2 will then obtain all the data within the object nodes 508 associated with the proper request node 506. A similar process is used to get the data within the thread node 516 of the metadata database.

In some examples, the hierarchical object database may be structured differently. For example, instead of a root node with server nodes 504 as the child nodes, there may be several root nodes, each root node corresponding to a server. Other data structures for organizing data within the object database or metadata database may be used as well.

Figure 6:
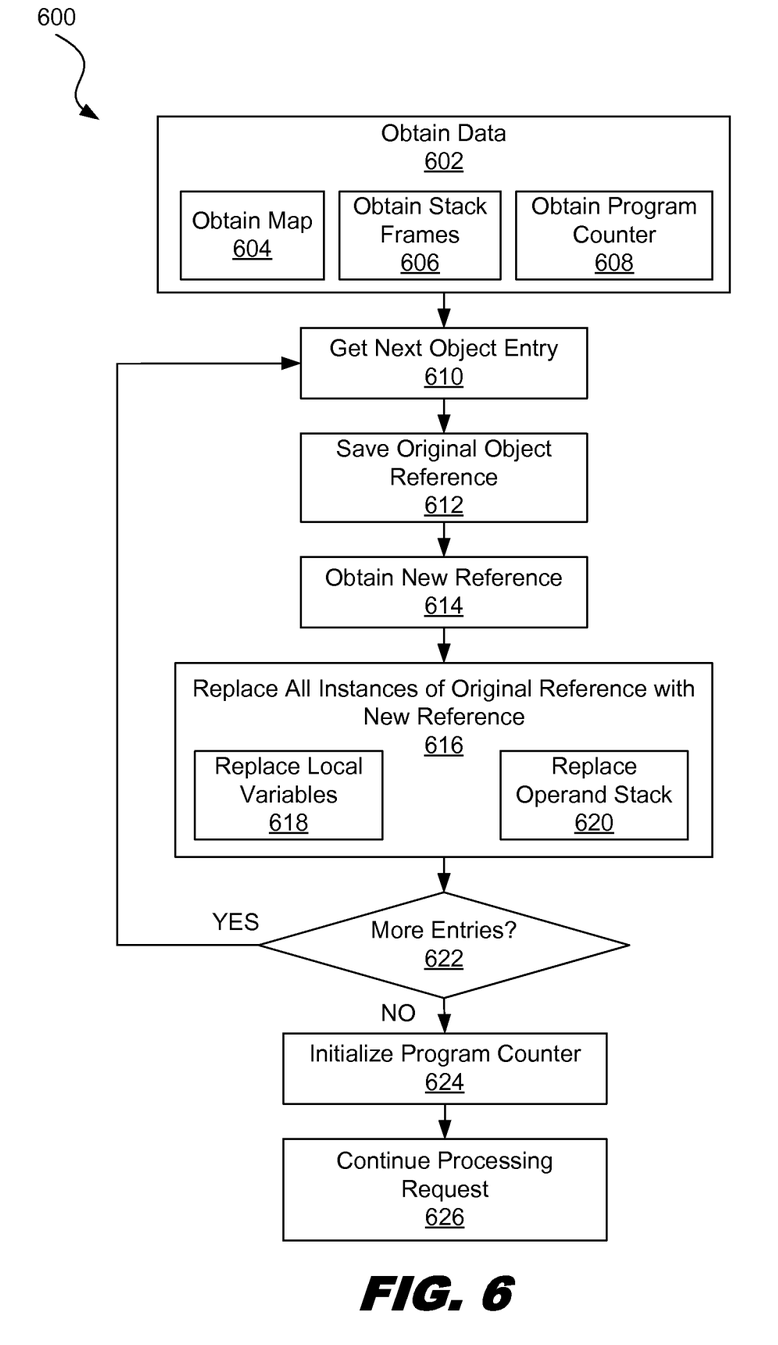
FIG. 6 is a flowchart showing an illustrative method for injecting a request into a server, according to one example of principles described herein.

FIG. 6 is a flowchart showing an illustrative method for injecting a process into a server. According to the present example, the method 600 includes a step 602 for obtaining data that will be used to take over processing a request. This step 602 includes a step 604 for obtaining a map of the objects that are to be stored on the heap of the server that is taking over the request. The map includes a set of key-value pairs. The key is the original reference for the object as it was stored in the previous server that started processing the request. The value is the object itself. Step 602 further includes a step 606 for obtaining the stack frames 606 for the threads associated with the request. The step 603 further includes a step 608 for obtaining the program counters for each of the threads.

The method 600 further includes a step 610 for getting the next object entry from the map. At step 612, the original object reference is saved. At step 614, a new reference is obtained. Specifically, when the object is loaded onto the heap of the server that is taking over the request, it will be assigned a reference value for the new heap. If the object has been serialized for transport over a network connection, then the object is de-serialized before being loaded into the heap. The new reference value is then assigned to the object.

At step 616, all the instances of the original reference are replaced with the new reference. Step 616 includes a step 618 for replacing all the original references with the new reference in the local variables portion of all the stack frames. Step 616 also includes a step 620 for replacing all the original references with the new reference in the operand stack portion of all the stack frames. After all the replacements have been made, the current object entry of the map can be removed from the map.

At step 622, it is determined whether there are any more entries within the map. If there are more entries, then the method 600 returns to step 610 and the method repeats for a different object. If there are no more entries, then the method 600 proceeds to the next step. After all the entries have been processed, all the references to objects in the call stack will be appropriately replaced.

The method 400 further includes a step for initializing the program counter. As described above, the program counter is typically a memory reference stored in one of the processor registers. The memory reference tells the processor where to fetch the next instruction for processing. Initializing the program counter may include setting the program counter to the memory reference of the next instruction to be fetched. The next instruction should correspond to the point at which the second server is to take over processing of the request. At step 626, the server continues processing the request. Thus, the processing of the request does not have to start from the beginning. Rather, the processing of the request can start where the previous server left off.

In some examples, if the source code for the process request is written in Java, then the method 600 can be implemented using an extension of Java's thread class. In one example, the class can be called InjectedThread. The constructor of the InjectedThread class can be designed to accept three arguments, which are the map, the stack frames, and the program counter. The server that takes over processing of a request can create an instance of the InjectedThread class for each thread of the process request that started execution on the original server. In some examples, the JVM may be modified to support the InjectedThread class.

Some examples of processing systems described herein may include non-transitory, tangible, machine readable media that include executable code that when run by one or more processors (e.g., processor 202) may cause the one or more processors to perform the processes of methods 300, 400, and 600 as described above. Some common forms of machine readable media that may include the processes of methods 300, 400, and 600 for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computing system, the method comprising:
    with a first server, receiving a process request;
    starting processing of the process request, the starting including a switching manager sending the processing request to the first server, wherein the switching manager monitors the status of a set of servers within a cluster;
    prior to completing the processing of the process request:
        storing objects associated with a thread of the process request in an object database that is accessible by a second server, the object database being different than the second server;
        storing thread metadata for the thread of the process request in a metadata database that is accessible by the second server, the storing thread metadata being performed by the first server, wherein the thread metadata includes a program counter, a stack, and a stack frame for the thread, wherein the object database and the metadata database are hierarchical structures that include data for the set of servers within the cluster; and
        after storing the thread metadata, sending a transfer request from the first server to the switching manager, the transfer request being to request that the process request be shifted from the first server to the second server, wherein storing the objects, storing the thread metadata, and sending the transfer request is in response to determining that the second server is closer to a resource that is utilized by the process request.

2. The method of claim 1, further comprising:
    with the switching manager, receiving a set of arguments along with the transfer request;
    based on the arguments, selecting one of a number of servers to continue execution of the process request, the one of the number of servers being the second server; and
    sending an instruction to the second server to continue processing the process request.

3. The method of claim 2, further comprising:
    with the second server, receiving the instruction to continue execution of the process request;
    loading the thread metadata of the thread of the process request from the metadata database;
    loading the objects associated with the thread of the process request from the object database; and
    continuing processing the process.

4. The method of claim 3, further comprising, replacing memory addresses within the objects before continuing execution of the process request.

5. The method of claim 3, wherein the objects are removed from the object database and the thread metadata is removed from the metadata database after being loaded to the second server.

6. The method of claim 1, wherein storing the objects, storing the thread metadata, and sending the transfer request is in response to determining that the second server is better capable of executing the process request.

7. The method of claim 1, wherein the process request is associated with a distributed application.

8. A method performed by a server, the method comprising:
    receiving, from a switching manager, a transfer request to continue processing of a process request that has been started and not completed by another server, wherein the switching manager monitors the status of a set of servers within a cluster, wherein the server is selected to continue processing the process request based on a proximity to a resource utilized by the process request;
    loading, from a periodically updated metadata database, thread metadata associated with each thread of the process request, the thread metadata being stored in the metadata database by the other server, wherein the thread metadata is updated before receiving the transfer request, wherein the thread metadata includes a program counter, a stack, and a stack frame for the thread,;
    loading, from a periodically updated object database, objects associated with each thread of the process request, the objects being stored in the object database by the other server during the processing of the process request, the object database being different than the server, wherein the object database and the metadata database are hierarchical structures that include data for the set of servers within the cluster; and
    continuing processing of the process request.

9. The method of claim 8, wherein the periodically updated object database and periodically updated metadata database are updated at a period within a range of 5 seconds to 60 seconds.

10. The method of claim 8, wherein the server is selected to continue processing the process request based on capabilities of the server.

11. The method of claim 8, further comprising replacing object memory addresses within a stack frame of the thread with memory addresses for the server.

12. The method of claim 11, wherein replacing object memory addresses is done using an extended thread class.

13. The method of claim 12, wherein the extended thread class takes parameters including: a map of objects stored in a heap of the other server, an array of stack frames, and a program counter.

14. A system comprising:
a switching manager;
an object database;
a metadata database; and
a plurality of servers within a cluster, each of the servers comprising:
  a processor; and
  a memory comprising machine readable instructions that when executed by the processor, cause the server to:
    receive from the switching manager, a transfer request to execute a process request, wherein the switching manager monitors the status of a set of servers within a cluster;
    store objects associated with a thread of the process request in the object database, the object database being accessible by the plurality of servers, the object database being different than the plurality of servers; and
    store thread metadata for the thread of the process request in the metadata database, the metadata database being accessible by the plurality of servers, the storing thread metadata being performed by a server, wherein the thread metadata includes a program counter, a stack, and a stack frame for the thread, wherein the object database and the metadata database are hierarchical structures that include data for the set of servers within the cluster; and
  wherein, in response to an event that occurs after the storing thread metadata, the switching manager is to cause the process request to be shifted to another one of the plurality of servers, wherein the event comprises instructions from a first one of the plurality of servers to switch execution of the process request to another one of the plurality of servers, wherein storing the objects, storing the thread metadata, and the event is in response to determining that the another one of the plurality of servers is closer to a resource that is utilized by the process request.

15. The system of claim 14, wherein the objects and thread metadata are periodically updated, and the event comprises failure of a server.

* * * * *